July 29, 1924.
J. C. LINCOLN
ARC WELDING
Filed May 22, 1922
1,502,789
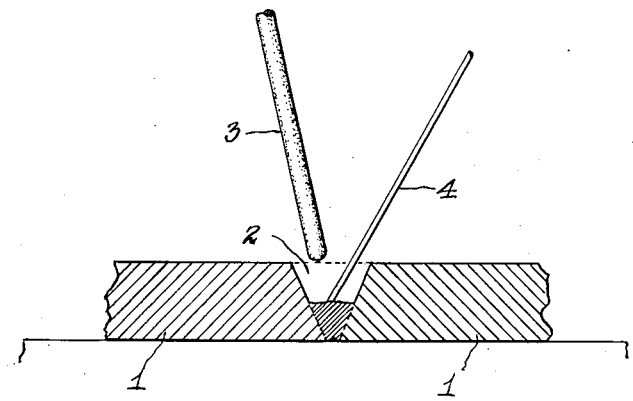
INVENTOR.
John C. Lincoln
BY
Fay, Oberlin & Fay
ATTORNEYS Patented July 29, 1924.

1,502,789

UNITED STATES PATENT OFFICE.

JOHN C. LINCOLN, OF CLEVELAND, OHIO, ASSIGNOR TO THE LINCOLN ELECTRIC COMPANY OF CLEVELAND, OHIO, A CORPORATION OF OHIO.

ARC WELDING.

Application filed May 22, 1922. Serial No. 562,650.

*To all whom it may concern:*

Be it known that I, JOHN C. LINCOLN, a citizen of the United States, and a resident of Cleveland, county of Cuyahoga, and State of Ohio, have invented a new and useful Improvement in Arc Welding, of which the following is a specification, the principle of the invention being herein explained and the best mode in which I have contemplated applying that principle, so as to distinguish it from other inventions.

In the electrical welding together of cast iron parts, either where such parts are to be united de novo or where cracks or breaks in castings are to be filled, the metal ordinarily employed to fill the joints or such cracks or breaks has been steel which has been deemed preferable because of its strength. The welding operation is conducted by melting down a steel pencil which is introduced into an electric arc struck between the work and the end of such pencil, or preferably between the work and a separate carbon electrode. However, the use of steel for the purpose stated has the objection that while its rate of shrinkage is not greatly different from that of cast iron, its tensile strength is considerably greater, so that upon cooling there is a tendency for small cracks or flaws to develop along the line of the weld. In other words, in passing from molten to solid state, the deposited body of steel will contract, and, due to its tensile strength, instead of stretching, it will pull away from the adjacent edges of the cast iron parts.

The object of the present invention is to overcome the difficulty in question which I have found may be done by employing copper, instead of steel, for the purpose of thus welding cast iron or other ferrous metal by the use of an electric arc.

The invention accordingly consists of the steps hereinafter fully described and particularly pointed out in the claims, the annexed drawing and the following description setting forth in detail one approved method of carrying out the invention, such disclosed mode, however, constituting but one of the various ways in which the principle of the invention may be used.

In said annexed drawing:—

The single figure there appearing represents in more or less diagrammatic fashion the making of an electrically welded joint in accordance with my present improved method.

As shown in said drawing, by way of illustration, two separate cast iron parts 1, 1, are to be united and with this in view their meeting edges are slightly beveled so as to leave a trough or hollow 2. As will be readily understood, however, the latter may just as well represent a properly prepared seam or crack in an integral cast iron piece. Preferably the arc is first struck between a separate carbon electrode 3 and the lower edges of the work which define such trough 2, and when such edges have been raised to approximately the melting point, the end of a copper pencil 4 is introduced in the arc and as the metal composing such pencil is melted and starts to fill the trough, the end of the pencil is inserted in the molten body of the metal and such pencil fused down until the trough is filled. It is considered desirable to melt just as little of the cast-iron as possible during the operation so as to avoid so far as possible the formation of chilled cast-iron, which will interfere with subsequently machining across the joint. The arc is accordingly played mostly on the body or pool of molten copper and on the edges of the cast-iron parts only enough to insure a real amalgamation thereof with the copper.

The operation just descrbied is continued until the trough is substantially filled level with the surface of the work on either side. While the copper upon cooling will shrink at a slightly greater rate than the adjacent heated portions of the work, the tendency to form the cracks, or flaws which develop where steel is used as the welding material, is minimized because such copper is more ductile than steel and will accordingly stretch, rather than break, even where a disparity in rates of shrinkage exists. Finally, the copper has about the same tensile strength as the cast iron so that a joint between cast iron parts, or a repair made in a piece of cast iron, will be just as strong as the remainder of such parts or piece.

While reference has herein been made particularly to the welding together of cast iron parts it will be understood that my improved method or process may also be advantageously employed in welding parts composed of other ferrous metal where like difficulties are encountered.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of electrically welding together parts composed of a ferrous metal, which consists in striking an electric arc between a suitable electrode and the juxtaposed edges of the parts to be united, and fusing copper by the heat produced in such arc until the space between the parts is filled with such last-mentioned metal.

2. In a method of electrically welding together cast iron parts, the steps which consist in striking an electric arc between a suitable electrode and the juxtaposed edges of the parts to be united, and fusing the end of a copper rod by the heat produced in such arc, until the space between the parts is filled with such last-mentioned metal.

3. In a method of electrically welding together cast iron parts, the steps which consist in striking an arc between a suitable electrode and the juxtaposed edges of the parts to be united, whereby such edges are superficially fused; and simultaneously fusing the end of a copper rod by the heat produced in such arc, whereby such copper amalgamates with such edges and fills the space therebetween.

4. In a method of electrically welding together cast iron parts, the steps which consist in striking an arc between a suitable electrode and the juxtaposed edges of the parts to be united, whereby such edges are superficially fused, simultaneously fusing the end of a copper rod by the heat produced in such arc, whereby such copper amalgamates with such edges and fills the space therebetween; and, after thus initiating the operation, playing the arc mostly on the body of molten copper in such space, and fusing further portions of such rod by feeding same in such body.

Signed by me this 20th day of May, 1922.

JOHN C. LINCOLN.